United States Patent
Karakoussis et al.

(10) Patent No.: US 11,919,197 B2
(45) Date of Patent: Mar. 5, 2024

(54) APPARATUS AND METHOD FOR CASTING A STUCCO SLURRY LAYER OF DEFINED WIDTH ONTO A LINER FOR PRODUCTION OF GYPSUM PLASTERBOARDS

(71) Applicant: Knauf Gips KG, Iphofen (DE)

(72) Inventors: Stergios Karakoussis, Laubach (DE); Alexander Hartmann, Kleinlangheim (DE); Georgi Paraskov, Neustadt an der Aisch (DE)

(73) Assignee: Knauf Gips KG, Iphofen (DE)

( * ) Notice: Subject to any disclaimer, the term of this patent is extended or adjusted under 35 U.S.C. 154(b) by 208 days.

(21) Appl. No.: 17/416,332

(22) PCT Filed: Dec. 19, 2018

(86) PCT No.: PCT/EP2018/000566
§ 371 (c)(1),
(2) Date: Jun. 18, 2021

(87) PCT Pub. No.: WO2020/125914
PCT Pub. Date: Jun. 25, 2020

(65) Prior Publication Data
US 2022/0063131 A1    Mar. 3, 2022

(51) Int. Cl.
*B28B 19/00* (2006.01)
*E04C 2/04* (2006.01)

(52) U.S. Cl.
CPC ...... *B28B 19/0092* (2013.01); *B28B 19/0015* (2013.01); *E04C 2/043* (2013.01)

(58) Field of Classification Search
CPC ........................... B28B 19/0092; B28B 5/027
See application file for complete search history.

(56) References Cited

U.S. PATENT DOCUMENTS

| | | | |
|---|---|---|---|
| 1,348,387 A | 8/1920 | Armstrong | |
| 3,832,250 A | 8/1974 | Pearson | |
| 3,944,698 A * | 3/1976 | Dierks | E04C 2/06 428/312.4 |
| 6,190,476 B1 * | 2/2001 | Seecharan | B28B 19/0092 156/39 |
| 6,485,821 B1 * | 11/2002 | Bruce | E04C 2/043 428/156 |

FOREIGN PATENT DOCUMENTS

WO    2015185251 A1    12/2015

* cited by examiner

Primary Examiner — Scott W Dodds
(74) Attorney, Agent, or Firm — Mark Terry

(57) ABSTRACT

The invention concerns an apparatus for furnishing a liner with a layer of stucco slurry, comprising at least:
  a conveying device (24) for conveying a liner (7), said conveyor device defining a transport direction (31);
  a stucco slurry feeder device (26) for casting stucco slurry onto the liner (7);
  a stucco slurry distribution device (27) for distributing stucco slurry cast onto the liner (7); and
  at least one stripper device (28) for stripping stucco slurry from lateral portions of the liner.
The invention further concerns a method for furnishing a liner with a layer of stucco slurry of defined width and a method for producing a gypsum plasterboard.

3 Claims, 5 Drawing Sheets

Figure 1:
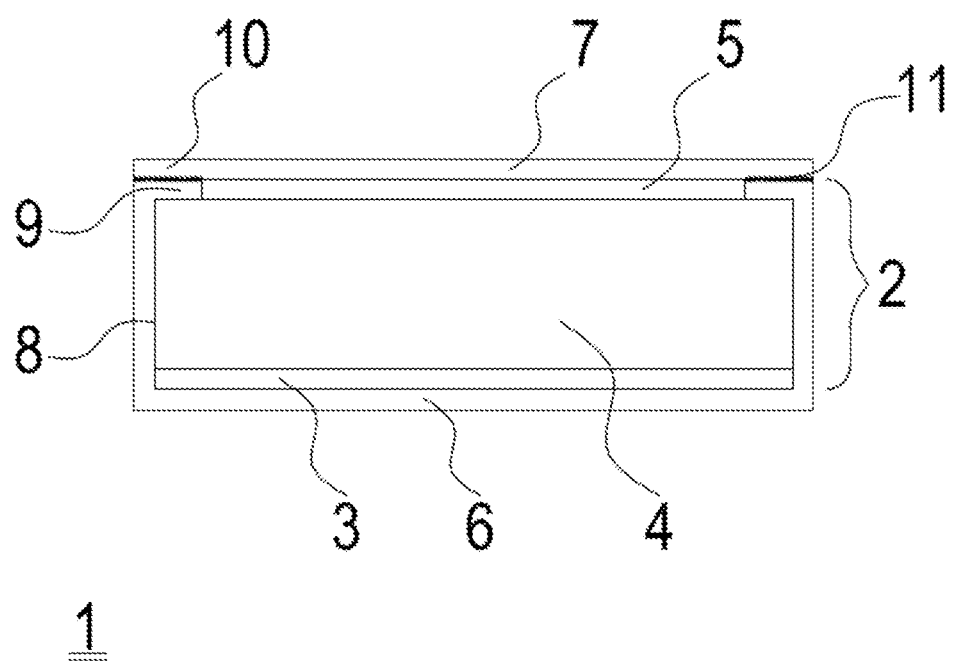

APPARATUS AND METHOD FOR CASTING A STUCCO SLURRY LAYER OF DEFINED WIDTH ONTO A LINER FOR PRODUCTION OF GYPSUM PLASTERBOARDS

The invention concerns an apparatus for furnishing a liner with a layer of stucco slurry of defined width, to a method for furnishing a liner with a layer of gypsum of defined width and to a method for producing gypsum plasterboards.

Gypsum plasterboards are popular as structural members of buildings. Such gypsum plasterboards are typically used to form partitions or walls of rooms, elevator shafts, stairwells, ceilings and the like. Gypsum plasterboards have to fulfill particular requirements towards e.g. fire resistance, impact resistance or durability against moisture. The performance of such gypsum plasterboards can be adapted by e.g. addition of suitable additives or by modifying the production process.

Gypsum plasterboards comprise a core of set gypsum sandwiched between two sheets of a liner. The gypsum layer imparts stiffness and impact stability to the board whereas the liners impart flexural rigidity to the gypsum plasterboard. To impart flexural rigidity, it is important to provide sufficient adhesive strength between the gypsum layer and the liners. Typical liners are paper, cardboard or mats made of synthetic fibers, mineral fibers, or glass fibers. The liner material for the front side and the rear side of a gypsum plasterboard can be the same or can be different. Typically the gypsum plasterboard has a front side covered with e.g. a smooth paper facing material wrapped around edges of the gypsum core. A rear side is likewise covered with e.g. paper facing material overlying the gypsum core. The facing material of the front side is typically wrapped around lateral edges of the board and is overlapping at its margins the rear side of the gypsum core. The rear side liner is placed on top of overlap portions of the front side liner and covers the rear side of the gypsum plasterboard. To obtain a firm connection between front side liner and rear side liner, an adhesive is applied between the overlap portions of front side and rear side liners.

The gypsum core can comprise several layers. Such multi-layer structure allows modification of the performance of the gypsum plasterboard. As an example, an inner gypsum layer may comprise larger pores, e.g. to reduce the weight of the gypsum plasterboard or to adapt its thermal conductivity. Adjacent to the inner gypsum layer may be provided on one or both sides a thin outer gypsum layer having performance different from the inner gypsum layer. The composition and performance of the outer gypsum layers oriented towards the front or rear side of the gypsum plasterboard may be the same or may be different. Such outer gypsum layer may e.g. have a higher density than the inner gypsum layer for e.g. increasing impact resistance of the gypsum plasterboard. The outer gypsum layer has to extend across the complete width of the gypsum plasterboard to provide the same performance across the complete front or rear surface of the gypsum plasterboard in order to ensure a homogenuous quality of the board. The outer gypsum layer may comprise e.g. glass fibers to improve fire resistance of the gypsum plasterboard. To fulfil requirements towards fire resistance it is important that the fibers are present also towards the lateral edges of the gypsum plasterboard.

Gypsum plasterboards are usually produced in a continuous manner in production lines.

In general, a gypsum plasterboard production line comprises a first conveyance device for continuously conveying a first liner, e.g. a paper sheet. The first liner will constitute the visible side of the gypsum plasterboard. For providing edges and side surfaces of the gypsum plasterboard that are covered with first liner, as well as for providing overlap portions of the first liner that will be placed on the rear side of the gypsum core, a scoring device is provided downstream of the conveyance device. The scoring device introduces scores into the first liner that correspond, after folding, to edges formed between front surface and side surfaces of the gypsum plasterboard as well as to an edge formed between side surfaces of the gypsum plasterboard and overlap portions on both lateral sides of the first liner that are folded onto the rear side of the gypsum core.

For preparation of stucco slurry a mixer is provided for mixing stucco, water and additives if required. For production of gypsum plasterboards having a multi-layer core, stucco slurries of differing composition or performance can be used to modify performance of the gypsum plasterboard. Accordingly, several mixers can be provided for preparation of several stucco slurries for formation of an inner gypsum layer and for preparation of stucco slurries of different compositions or densities for formation of further layers, for example outer gypsum layers adjacent to opposite sides of the inner gypsum layer. The outer layer stucco slurry can have e.g. a higher density than the core layer slurry.

For production of a gypsum plasterboard having a multi-layer core, a first layer of a first stucco slurry is cast onto the first liner and is distributed on the surface of the first liner as described above. The first layer of a first stucco slurry will form an outer layer of a gypsum core after setting. Onto the first layer of first stucco slurry then a second stucco slurry is cast to obtain a second stucco slurry layer. The second stucco slurry layer forms the inner layer of the gypsum core. However, it is possible that the inner layer comprises additional intermediate layers. All gypsum layers together form the core of the plasterboard. Before or simultaneously with the casting of the second stucco layer lateral portions of the first liner are folded upwardly to form side surfaces of the gypsum plasterboard and then lateral overlap portions of the first liner are folded onto the surface of the second stucco slurry layer. In case the inner stucco slurry layer has a multi-layered structure the lateral overlap portions of the first liner are folded onto the surface of the uppermost layer of the inner stucco slurry layer.

Further, a second conveyance device is provided for continuously conveying a second liner, e.g. a sheet of paper. The second liner has a narrower width than the first liner and basically has a width corresponding to the width of the gypsum plasterboard to be produced. A third stucco slurry is cast onto the second liner and is distributed across the surface of the second liner in such manner that lateral portions of the second liner are kept void of stucco slurry. An adhesive is applied to lateral portions of the second liner to obtain lateral adhesive portions and the second liner with the stucco slurry layer deposited thereon is then joint-deposited onto the second stucco slurry layer deposited on the first liner. The third stucco-slurry layer deposited on the second layer and first and second stucco-slurry layer deposited on the first liner are joined to form the gypsum core of the gypsum plasterboard after setting. The adhesive portions provided at lateral edges of the second liner are joined to overlap portions of the first liner folded on the surface of the second stucco slurry layer. The corresponding portions of first and second liner adhere to each other. The gypsum core surrounded by first and second liner is then transported to a forming device to be formed to a plate-shape structure.

WO 2015/185251 A1 describes a method for producing a gypsum plasterboard and the gypsum plasterboard obtained thereby. In the method for producing a gypsum plasterboard a second stucco slurry is deposited onto a first liner for the formation of a first intermediate layer. A first stucco slurry is deposited onto the first intermediate layer for the formation of a core layer.

A third stucco slurry is deposited onto the core layer or onto a second liner under formation of a second intermediate layer. The third stucco slurry is then either covered by the second liner or the second liner is joint-deposited with the third stucco slurry layer onto the core layer. The multi-layer-gypsum plasterboard is then smoothed by a smoothing device, e.g. a smoothing bar.

As mentioned above, a good adhesion of first and second liners to the gypsum core is important for obtaining high flexural rigidity of gypsum plasterboards. Further, it is desired that a good adhesion between liners and gypsum core also is provided in edge portions of the gypsum plasterboard and that the first and second liner are firmly adhered to each other in the overlap portions. However, several difficulties exist in the methods of the state of the art for producing gypsum plasterboards.

Adhesion between gypsum core and liners is established by a web of gypsum crystals starting inside the liner and continued into the gypsum core. Stucco slurry intrudes into the liners and gypsum crystals precipitate inside the liner. A continuous web of gypsum crystals is formed that continues into the gypsum core. In particular if the inner layer of the gypsum core is produced from a stucco slurry of low density and pores are formed in the inner gypsum layer adhesion between liner and core is lowered. To improve adhesion between liner and gypsum core a thin layer of stucco slurry of high density is first cast onto the liner such that a thin layer of gypsum is obtained void of pores.

Then a better adhesion of the liner to the outer gypsum layers can be established than for a liner directly bound to a gypsum layer formed from the stucco slurry used for production of the inner gypsum layer, in particular when the inner layer is formed as porous layer. A further problem exists in that the adhesive bound between first and second liner in the overlap portions deteriorates if stucco slurry is spilled onto the overlap portions of the second liner before or after the adhesive is applied to these overlap portions. Due to fluctuations unavoidably occurring in the amount of outer layer stucco slurry conveyed from the mixer it is difficult and almost impossible to supply the outer layer stucco slurry in an amount to exactly cover the portion between the lateral portions of the liner and not to spill any stucco slurry onto lateral portions that are intended to receive the adhesive in a later production step.

According to the art therefore the amount of the third stucco slurry applied to the second liner is chosen smaller than the amount necessary to cover the complete area situated between lateral adhesive portions of the second liner and the third stucco slurry is not distributed across the complete area situated between lateral adhesive portions of the second liner to thereby avoid contamination of the adhesive portions by the third stucco slurry. For distributing the third stucco slurry across the second liner a roller is used having a width smaller than the width between lateral adhesive portions of the second liner. The main part of the third stucco slurry is distributed by the roller across the portion of the liner corresponding to the width of the roller. Excess third stucco slurry is spilled to the sides of the roller into a portion of the second liner adjacent to the lateral adhesive portions of the second liner.

Since the amount of second stucco slurry spilled into a portion of the second liner defined on the one side by the lateral adhesive portions and on the other side by a line defined by a lateral end of the roller due to fluctuations occurring in the stucco slurry feeder, portions remain in that area that are not covered by third stucco slurry and therefore will be contacted directly by the second stucco slurry layer in the further progress of the manufacture of the gypsum plasterboard.

In such portions therefore the adherence between second liner and gypsum core will be lower than in such portions where the second liner is in direct contact with the third stucco slurry layer. A particular problem occurs if the third stucco slurry has a composition different from the second stucco slurry. Then the surface performance of the gypsum plasterboard, e.g. impact resistance or fire resistance, will not be homogeneous across the surface of the gypsum plasterboard.

The problem to be solved by the invention therefore is to provide an apparatus for furnishing a liner with a layer of stucco slurry wherein the furnished liner allows production of gypsum plasterboards that have homogeneous surface performance across the complete surface of the gypsum plasterboard.

This problem is solved by an apparatus for furnishing a liner with a layer of stucco slurry according to claim 1. Preferred embodiments are subject of depending claims.

The apparatus for furnishing a liner with a layer of stucco slurry according to the invention is provided with at least one stripper for removing stucco slurry from portions of the liner that act as adhesive portions after application of a corresponding adhesive. Use of a stripper device allows the application of an amount of stucco slurry larger than necessary for covering a portion of the liner situated between lateral portions used for application of adhesive to obtain adhesive portions. This ensures the complete and homogeneous coverage of the portion of the liner located between lateral portions acting as adhesive portions by a layer of stucco slurry. Excess stucco slurry will spill over onto the lateral portions of the liner that will form the adhesive portions during the further production process and is removed from the lateral portions by the stripper device.

In a production process as described above the liner covered with a layer of stucco slurry of defined width corresponds to the second liner covered with the third stucco layer. Therefore, in such production process, after joint deposition of the second liner covered by the third stucco slurry layer to the second stucco slurry layer provided on the first liner and the thus formed gypsum plasterboard the complete contact surface located between lateral adhesive portions between the second liner and the gypsum core is formed by the third stucco slurry layer applied to the second liner. A homogeneous adhesion of the second liner to the gypsum core can therefore be established. Further, since the outside surface of the gypsum core corresponding to the contact surface between gypsum core and liner is homogeneously formed from the third stucco slurry, a homogeneous surface performance across the surface of the gypsum plasterboard formed by the second liner can be achieved. This is in particular an advantage for the utilization of the gypsum plasterboard in applications with strict specifications, e.g. fire resistance or water-proofness.

Stucco slurry spilled onto lateral portions of the liner is removed by the stripper before the adhesive is applied to these portions. A firm adhesion therefore is achieved between liner and adhesive. If the liner covered with a layer of stucco slurry of defined width is used in the production of gypsum plaster boards, since no stucco or gypsum is interfering with the adhesive layer present on lateral portions of the liner, a firm bond is established between first and second liner. Overall, a firm adhesion of the liner to the gypsum core is achieved.

According to the invention an apparatus is provided for furnishing a liner with a layer of defined width of stucco slurry, said apparatus comprising at least:
- a conveyor device for conveying a liner, said conveyor device defining a transport direction;
- a stucco slurry feeder device for casting stucco slurry onto the liner;
- a stucco slurry distribution device for distributing stucco slurry cast onto the liner; and
- at least one stripper device for stripping stucco slurry from lateral portions of the liner.

Any conveyor device known in the state of the art may be used and the conveyor device may take any suitable form. According to an embodiment, the conveyor device takes the form of a conveyor belt. The conveyor belt provides a flat surface whereon the liner is placed. According to a preferred embodiment the conveyor device can be a series of deflector rolls by which the liner is tauten and guided.

The conveyor device defines a transport direction. The transport direction corresponds to the direction of travel of the liner through the apparatus according to the invention.

The width of the conveyor device, e.g. the width of the conveyor belt or the deflector rolls can be selected without particular restrictions. According to an embodiment, the width of the conveyor device is selected according to the width of the liner and the width of the gypsum plasterboard to be produced such that a liner of a corresponding width can be placed onto the conveyor device without protruding.

According to an embodiment, the width of the conveyor device is selected larger than 200 mm, according to a further embodiment the width of the conveyor device is selected larger than 300 mm and according to a still further embodiment is selected larger than 325 mm. According to an embodiment, the conveyor line has a width of less than 6000 mm, according to a further embodiment of less than 4000 mm and according to a still further embodiment of less than 3000 mm. However, the width of the conveying device can be selected smaller or larger if required by a particular production process. The width of the conveyor device is understood to be the extension of the conveyor device perpendicular to the transport direction of the conveyor device. In an embodiment wherein a conveyor belt forms the conveying device, the distance between lateral edges of the conveyor belt is understood to be the width of the conveyor device. In an embodiment, wherein deflector rolls form the conveyor device, the size of a roll in a direction of its rotational axis is understood to be the width of the conveyor device.

The liner is delivered onto the conveyor device by a corresponding delivery unit as known in gypsum production lines according to the state of the art. A suitable delivery unit is a unit wherein the liner is stored in the form of a roll and the liner is continuously unwound from the roll to be delivered onto the conveyor device.

Further, a stucco slurry feeder device is provided. The stucco feeder device is used to cast a stucco slurry onto the liner. Any stucco feeder known from the state of the art can be used. A suitable stucco slurry feeder is e.g. a hose or a series of hoses, e.g. silicon hoses, wherein through the open end of the hoses, which for example are arranged in parallel, stucco slurry is cast onto the liner. If only one hose is provided, a device for moving the open end of the hose in a direction perpendicular to the transport direction can be provided to improve distribution of the stucco slurry across the surface of the liner. According to a further embodiment, a metering device can be provided at the stucco slurry feeder device to adjust the amount of stucco slurry cast onto the liner.

The slurry feeder is connected to a stucco slurry mixer as is known from gypsum plasterboard production lines of the state of the art.

A stucco slurry distribution device is provided downstream of the stucco slurry feeder device. The stucco slurry distribution device is used for distributing the stucco slurry cast onto the liner across the width of the liner.

Any distribution device can be used that allows distribution of the stucco slurry across the liner width.

According to an embodiment of the invention the distribution device takes the form of a roller. The roller is preferably arranged perpendicular to the transport direction.

According to an embodiment, the roller is equipped with a driving unit. The driving unit allows rotating the roller around its longitudinal axis. Further, a control unit can be provided with the driving unit to control rotation direction and rotation rate of the roller.

According to an embodiment the width of the roller is selected corresponding to a width of the portion of the liner that is arranged between lateral portions of the liner that are intended to be kept exempt from stucco slurry for application of an adhesive at a later production stage.

The width of the roller is understood to be the dimension of the roller in a direction of the rotational axis of the roller.

The stucco slurry is then distributed across a central portion of the liner. The central portion is corresponding to the portion of the liner arranged between lateral adhesive portions. A minor portion of the stucco slurry spills onto the portions of the liner that are used as adhesive portions and where adhesive is applied to at a later stage of the production.

According to an embodiment the width of the roller is selected to be at least 5 mm smaller than the width of the liner. According to a further embodiment, the width of the roller is selected to be at least 10 mm smaller than the width of the liner and according to a still further embodiment the width of the roller is selected to be at least 15 mm smaller than the width of the liner. According to an embodiment, the width of the roller is selected to be at most 40 mm smaller than the width of the liner. According to a further embodiment, the width of the roller is selected to be at most 35 mm smaller than the width of the liner and according to a still further embodiment, the width of the roller is selected to be at most 30 mm smaller than the width of the liner.

According to an embodiment, the width of the roller is selected larger than 20 cm, according to a further embodiment larger than 30 cm and according to an embodiment larger than 40 cm. According to an embodiment, the width of the roller is selected smaller than 6 m, according to a further embodiment smaller than 4 m and according to a still further embodiment smaller than 3 m.

The roller has according to an embodiment a diameter of more than 1 cm, according to a further embodiment of more than 2 cm, according to a still further embodiment of more than 5 cm. According to an embodiment, the roller has a diameter of less than 30 cm, according to a still further embodiment of less than 25 cm and according to a still further embodiment of less than 20 cm.

According to an embodiment of the invention, the roller or any other distribution device is arranged to rest on the liner provided on the conveyor device. Stucco slurry cast on the liner by the stucco feeder device is retained by the roller and distributed in a direction perpendicular to the transport direction by the rotational movement of the roller. Excess stucco slurry flows around terminal ends of the roller and is spilled on lateral portions of the liner. According to an embodiment, the roller has a direction of rotation directed against the transport direction of the liner. The stucco slurry retained and distributed in a transversal direction by the roller is picked up by the circumferential surface of the roller and is forming a film of a particular thickness on the circumferential surface. Upon further rotation of the roller the film is transferred onto the liner.

The distance between conveyor device and circumferential surface of the roller is selected small such that basically only the liner can pass below the roller.

A gap is formed between the conveyor device and the roller for passing the liner. The gap is selected preferably small such that only the liner passes and the stucco slurry is retained. According to an embodiment, the size of the gap is selected according to an embodiment smaller than 2 mm, according to a further embodiment smaller than 1 mm and according to a still further embodiment corresponds to a distance that the liner can pass below the roller. According to an embodiment, the gap is larger than 10 µm, according to a further embodiment larger than 100 µm.

According to an embodiment a stripper device is arranged downstream of the distribution device. The stripper device is used to strip stucco slurry from lateral portions of the liner.

The stripper device is arranged at least one longitudinal side of the conveyor device. The stripper device is arranged such that the stripper device can strip stucco slurry spilled on the lateral portions of the liner.

Preferably, the stripper device has an extension in a direction perpendicular to the transport direction that corresponds at least to the width of the lateral portions of the liner.

Any device that can remove stucco slurry from lateral portions of the liner can be used as a stripper device. A suitable stripper device is a device that e.g. brushes away stucco slurry from lateral portions of the liner, takes off, scrapes off or picks up stucco slurry from lateral portions of the first liner, sucks off stucco slurry from lateral portions, flushes away stucco slurry from lateral portions of the liner, or blows away stucco slurry from lateral portions of the liner.

The stripper device can comprise a single device for removal of stucco slurry from lateral portions of the liner or can comprise a multi-step device for removal of stucco slurry from lateral portions of the liner. The devices for removing stucco slurry from lateral portions of the liner forming the stripper device can be of the same type or can be of different types.

According to an embodiment, the removal of stucco slurry spilled on lateral portions of the liner is performed such that the stucco slurry is shifted towards an inner portion located between the lateral portions of the liner.

According to an embodiment the stripper device comprises a deflection side. A deflection side of the stripper device is understood to be that side of the stripper device that contacts the stucco layer deposited on the liner and moves or shifts the stucco layer aside. The deflection side is oriented in a direction facing the transport direction of the conveyor device. Stucco slurry present on the liner will be retained by the stripper device and thereby removed from the lateral portions of the liner. According to an embodiment the deflection side is tilted towards a middle line of the conveyor device.

According to an embodiment, the deflection side of the stripper device is tilted around an axis perpendicular to a plane defined by the conveyor device or the liner transported on the conveyor device. According to an embodiment, the deflection side and a plane transversal to the transport direction enclose an angle that is selected larger than 90°, according to a further embodiment larger than 100° and according to a still further embodiment is selected larger than 120°. According to a further embodiment, the angle is selected to be smaller than 150°, according to a further embodiment to be smaller than 140°. In an exemplary embodiment, the angle enclosed between the deflection side of the stripper device and a plane transversal to the transport direction is selected to be about 135°. The angle is selected such that the stucco slurry provided in lateral portions of the liner is shifted towards the inner portion of the liner.

The deflection side of the stripper device can be formed as flat surface. According to a further embodiment, the plane of the deflection side of the stripper device can be curved at least in parts in one or two dimensions. According to a further embodiment, the stripper device comprises curved portions and flat portions.

According to an embodiment, the stripper device can have the form of a block. An exemplary form of a block is a cuboid. According to an embodiment at least one edge of the cuboid can have a rounded profile. According to an embodiment, at least an edge of the cuboid contacting the liner has rounded profile.

According to a further embodiment, the stripper device comprises a scraper lip. The scraper lip is formed at the lower end of the stripper device and is oriented towards the conveying device and the liner. The stripper device contacts the liner with the scraper lip to efficiently remove stucco slurry spilled onto lateral portions of the liner.

For establishing an intense contact between the stripper device, in particular a scraper lip of the stripper device, and the surface of the liner, a device for pressing the stripper device onto the liner surface can be provided. According to an embodiment a spring or a hydraulic device that can initiate the application of pressure by the stripper device towards the liner can be such a device for pressing the stripper onto the liner surface.

The stripper device can take a massive, filled form, for example the form of a continuous block, e.g. a massive rubber block.

According to another embodiment, the stripper device can be a hollow form with a hollow interior space and walls surrounding the hollow interior space and forming the outer surfaces of the stripper device.

By using a hollow form the weight of the stripper device can be reduced. Further, the stripper device can be flexible such that a better and intense contact between the stripper device and the liner can be achieved.

According to a further embodiment, the stripper device has the form of a blade. The blade can be made from a stiff material, e.g. a ceramic material, a metal material or a plastic material having low or no flexibility. According to a further embodiment, the blade is made from a flexible material, e.g. steel, for example spring steel. The blade has an edge that can be applied onto the surface of the liner to thereby shift the stucco slurry layer present in lateral portions of the liner aside.

During production of gypsum plasterboards stucco slurry is permanently removed from lateral portions of the liner by the stripper device. As soon as water has been added to the stucco for preparation of the stucco slurry, setting of the stucco slurry starts. Build-up of deposits therefore can occur, in particular on the surface of the stripper device facing the transport direction and acting to shift aside stucco slurry. A suitable cleansing mechanism is preferably provided. The stripper device can be made of any suitable material, e.g. metals, like steel, ceramics, rubber, or plastics. Suitable plastics are polymers, e.g. polymers selected from fluorinated polymers or from block-copolymers. A suitable block-copolymer is acrylonitrile-butadiene-styrene blockcopolymer. For increase of durability and hardness of the material used for the stripper device, filler can be comprised in the material. Suitable fillers are e.g. fibers, like glass or mineral fibers, mineral powder, like sand, in particular quartz sand, clay minerals, etc.

The stripper device can be made as a single piece or can comprise several parts. According to an embodiment the stripper device can comprise a main body and a scraper lip, for example a scraper lip that can be replaced separately from the main body. The scraper lip experiences wear due to the continuous contact with the liner and therefore has to be replaced from time to time.

The size of the stripper device is selected according to the size of the lateral portion of the liner which are intended to receive adhesive for obtaining lateral adhesive portions of the liner. The stripper device at least has a width sufficient to remove stucco slurry from lateral portions of the liner.

According to an embodiment, the stripper device has a width of more than 4 mm, according to a further embodiment of more than 5 mm and according to a still further embodiment of more than 10 mm. According to an embodiment, the stripper device has a width of less than 30 cm, according to a further embodiment of less than 20 cm and according to a still further embodiment of less than 15 cm. The width of the stripper device according to an embodiment corresponds to the width of the surface facing the transport direction of the conveying device and used to shift aside or to remove stucco slurry from lateral portions of the liner.

According to a further embodiment, the height of the stripper device is selected to be more than 2 cm, according to an embodiment more than 5 cm and according to a still further embodiment more than 8 cm. According to an embodiment, the height of the stripper device is selected less than 20 cm, according to a further embodiment less than 15 cm. The height of the stripper device is understood to be the vertical distance between the lowermost end of the stripper device when mounted to the conveying device and the uppermost level of the stripping device.

The dimensions provided above refer to the deflection side of the stripper device used for removing stucco slurry form the liner. The dimensions provided above are to be understood exemplary. Larger or smaller dimensions than the dimensions provided above can be used depending on the actual material used for the stripper device.

According to an embodiment, a distance between the stucco slurry distribution device and the stripper device is less than 1000 mm. According to a further embodiment, the distance between the stucco slurry distribution device and the stripper device is less than 500 mm and according to a still further embodiment is less than 300 mm. According to an embodiment, the distance between the stucco slurry distribution device and the stripper device is more than 50 mm. According to a further embodiment, the distance between the stucco slurry distribution device and the stripper device is more than 70 mm and according to a still further embodiment is more than 100 mm. A smooth surface of the liner can then be obtained after removal of the stucco slurry. In case e.g. paper or cardboard is used as a liner, water contained in the stucco slurry can intrude into the liner and can effect swelling or felting of the liner. By removing the stucco slurry within a short period after application, such effect can be avoided and a smooth and solid liner surface can be maintained in the lateral portions.

According to an embodiment of the invention a scrubbing device can be provided downstream of the at least one stripper device. The scrubber device is used for scrubbing lateral portions of the liner for removing residual stucco slurry from lateral portions of the liner that remain after most of the stucco slurry has been removed by the stripper device.

As mentioned above, the adhesion of the adhesive to the liner can be compromised if residual stucco slurry or gypsum particles are present on lateral portions of the liner. Any scrubbing device can be used that is suitable for removal of residual stucco slurry or gypsum particles from lateral portions of the liner. A suitable scrubbing device is for example a brush that brushes away residual stucco slurry or gypsum particles. The brush can be stationary or can be rotating. The brush can be provided e.g. with plastic or metal bristles. According to a further embodiment, the scrubbing device takes the form of a nozzle for spraying a cleaning agent onto the overlap portion of the liner. A suitable cleaning agent is e.g. water or pressurized air.

According to an embodiment, the scrubbing device comprises a grinder device for roughening the surface of the liner in lateral portions. Grinder devices know from the state of the art can be used. A suitable grinder device is a grinder disk, a grinder band or a grinder belt. The surface of the grinder device contacting the liner, in particular lateral portions of the liner, is covered with a suitable abrasive, e.g. corundum particles.

The grinder device roughens the liner surface in lateral portions of the liner. A thin layer of liner can be abraded, resulting in the removal of any residual stucco slurry or gypsum particles from the lateral liner portions. The liner is thinned in the abraded lateral portions of the liner. The inventors have found that a thinning of the lateral portions of the liner is advantageous. After the lateral portions of the liner are adhered to portions of the other liner during the production of gypsum plasterboards, the overall thickness of the combined layers is reduced. Water vapor evolving during drying of the gypsum plasterboard can pass the reduced thickness of the combined liners more easily. A homogenous drying process can be achieved for the gypsum core of the gypsum plasterboard.

According to an embodiment, an adhesive feeder is provided for applying adhesive onto lateral portions of the liner.

The adhesive feeder is arranged downstream of the stripper device, preferably downstream of the scrubbing device or the grinder device and is used for applying adhesive onto lateral portions of the liner arranged along its longitudinal edges.

According a further embodiment the apparatus comprises two adhesive feeders or two groups of adhesive feeders arranged at lateral sides of the conveyor device. Since lateral portions are usually provided along both lateral sides of the liner, corresponding adhesive feeders are provided on both lateral sides of the conveyor device.

Adhesive feeders known from the state of the art can be used. The adhesive feeder can comprise a nozzle for applying a line or a row of dots of adhesive onto lateral portions of the liner. According to another embodiment, the adhesive feeder comprises a transfer roll for the application of the adhesive onto the overlap portions of the first liner.

An adhesive distribution device can be provided downstream of the adhesive feeder for distributing the adhesive across at least part of the width of the lateral portion of the first liner. The adhesive distribution device is arranged at lateral sides of the conveying device and of the liner at a position that allows to distribute the adhesive applied to the liner in the lateral portion, e.g. in the form of a line or a row of dots, across the lateral portions of the liner.

During application and distribution of the slurry layer on the liner, small variations in the producing process can hardly be avoided. For example, the position of the liner on the conveying device can fluctuate slightly in a direction transversal to the transport direction. From time to time it is therefore necessary to adjust the position of the stripper device, of the scrubbing device, or of the adhesive feeder to the position of the liner and of lateral portions of the liner.

According to an embodiment, the at least one stripper device and the at least one scrubbing device are provided as a common unit. A common unit is understood to be a unit wherein the at least one stripper device and the at least one scrubbing device are rigidly fixed to one another, having a fixed position relative to each other. When adjusting the position of the at least one stripper device and the at least one scrubbing device only one adjustment process is necessary. According to an embodiment, the common unit is provided as a shiftable unit. This does not exclude that the stripper device is mounted movably so that its angle with respect to the transport direction can be adjusted, for example if the production speed changes.

According to a further embodiment, the common unit further comprises the adhesive feeder. The position of the stripper device, the scrubbing device and of the adhesive feeder then can be adjusted in a single step.

According to an embodiment, the common unit can be shifted at least in a direction perpendicular to the transport direction.

According to a further aspect, the invention pertains to a method for furnishing a liner with a layer of stucco slurry of defined width, wherein
 a liner is provided and continuously conveyed along a transport direction;
 a stucco slurry is cast onto a surface of the liner;
 the stucco slurry is distributed across the liner; and the stucco slurry is removed from lateral portions of the liner.

According to the method of the invention a liner is provided. The liner can be selected from materials as used in the art of manufacturing of gypsum plasterboards. Suitable materials are paper, cardboard, woven or non-woven mats made from fibers, especially cellulosic, glass, mineral or synthetic fibers or mixtures thereof. However, other materials can be used as well. The liner has a thickness as commonly used in the art of manufacturing gypsum plasterboards. According to an embodiment, the thickness of the liner is selected larger than 40 µm, according to a further embodiment larger than 50 µm, and according to a still further embodiment larger than 60 µm. According to an embodiment, the thickness of the liner is selected smaller than 500 µm, according to a further embodiment smaller than 300 µm and according to a still further embodiment smaller than 200 µm.

The width of the liner is selected according to the width of the gypsum plasterboard to be produced. The width of the liner corresponds to an extension of the liner transversal to the transport direction. Gypsum plasterboards are usually produced in standardized sizes and the dimension of the liner is selected accordingly. According to an embodiment, the width of the liner is selected larger than 200 mm, according to a further embodiment larger than 300 mm, according to a still further embodiment larger than 350 mm. According to an embodiment, the width of the liner is selected smaller than 6 m, according to a further embodiment smaller than 2 m and according to a still further embodiment smaller than 1500 mm. However, liners of smaller or larger width can be used as well.

In a direction corresponding to the transport direction the length of the liner can be selected as large as technically suitable. The liner can for example be provided in rolled form and the liner is continuously conveyed from the roll. For practical purposes the liner length can be considered to be endless.

The liner is continuously conveyed along the transport direction. The conveying rate can be varied within a wide range and is depending for example on the production line used, on the type and consistency of the stucco slurry, the capacity of the dryer and other process parameters. According to an embodiment, the conveying rate is selected larger than 5 m/min, according to a further embodiment larger than 10 m/min and according to a still further embodiment larger than 25 m/min. According to an embodiment, the conveying rate is selected smaller than 400 m/min, according to a further embodiment smaller than 300 m/min and according to a still further embodiment smaller than 250 m/min. However, higher or lower conveying rates can be used as well.

A stucco slurry is then cast onto the surface of the liner. A stucco slurry is used as commonly used in the art of production of gypsum plasterboards and the composition of the stucco slurry is selected according to the desired performance of the gypsum plasterboard to be produced, in particular to the performance of the surface layer of the gypsum plasterboard.

According to an embodiment, the stucco slurry comprises stucco (basically calcium sulfate hemihydrate) in an amount of more than 30 wt. %, according to a further embodiment of more than 40 wt. %, and according to a still further embodiment of more than 45 wt. %. According to an embodiment, the stucco slurry comprises stucco in an amount of less than 70 wt. %, according to a further embodiment of less than 60 wt. % and according to a still further embodiment of less than 55 wt. %.

According to an embodiment, the first stucco slurry comprises water in an amount of less than 70 wt. %, according to a further embodiment of less than 60 wt. % and according to a still further embodiment of less than 55 wt. %. According to an embodiment the first stucco slurry comprises water in an amount of more than 30 wt. %, according to a further embodiment of more than 40 wt. %, according to a still further embodiment of more than 45 wt. %.

The percentages refer to the weight of the stucco slurry.

Amounts of stucco and water higher or lower than mentioned above can be used as well. The amount of water and stucco is selected according to the production line used for manufacturing of gypsum plasterboards and according to the desired performance of the gypsum plasterboard to be produced.

The stucco slurry can comprise additives in amounts common in the art of plasterboard production. Suitable additives are known from the state of the art. Exemplary additives are glass fibers, mineral fibers, accelerators, retarders, rheology additives, strengtheners etc. The list of additives is only exemplary and not limited to the additives mentioned.

The stucco slurry is then distributed across the liner. The stucco slurry can be distributed across the whole width of the liner. However, preferably the stucco slurry is distributed in a central portion arranged between lateral portions of the liner such that a layer of stucco slurry covers the entire central portion and only minor amounts of the stucco slurry are spilled onto lateral portions of the liner.

A lateral portion of the liner is understood to be a portion of the liner surface extending from the outer edge of the liner towards an inner portion of the liner and extending in a longitudinal direction of the liner along the outer edges of the liner. Preferably lateral portions are arranged at both outer edges of the liner. The lateral portions form stripes on the liner surface extending along the edges of the liner.

According to an embodiment lateral portions and a central portion arranged between the lateral portions are provided on the liner and the stucco slurry is distributed at least across the central portion of the liner such that at least the central portion of the liner is completely covered with a layer of stucco slurry.

According to an embodiment, the distribution of the stucco slurry across the width of the liner, in particular across the central portion of the liner is performed by a roller. The roller is arranged perpendicular to the transport direction of the liner. The roller is preferably contacting the liner surface and is preferably rotating in a rotation direction against the transport direction of the liner. At the contact line of liner and circumferential surface of the roller the liner and the circumferential surface of the roller then move in opposed directions. The circumferential surface of the roller slides on the liner surface and thereby the roller surface is cleaned.

The stucco slurry cast onto the surface of the liner is retained by the roller and is distributed in a direction perpendicular to the transport direction of the liner across the width of the roller. The rotating roller picks up stucco slurry on its circumferential surface and then transports the stucco slurry to a downstream side of the roller to then transfer a stucco slurry layer onto the surface of the liner that has passed the roller. The layer thickness of the stucco slurry layer transferred onto the liner can be adjusted by the rotational speed of the roller.

According to an embodiment, the thickness of the stucco slurry layer is selected larger than 100 μm, according to an embodiment larger than 150 μm and according to a still further embodiment larger than 200 μm. According to an embodiment, the thickness of the stucco slurry layer is selected smaller than 2 mm, according to a further embodiment smaller than 1.5 mm and according to a still further embodiment smaller than 1 mm.

However, the thickness of the stucco slurry layer can be selected smaller or larger for applications that require production of gypsum plasterboards having outer gypsum layers of smaller or larger thickness than mentioned above.

Excess stucco slurry passes the roller on lateral sides of the roller and is spilled onto lateral portions of the liner.

The width of the stucco slurry layer transferred onto the liner is depending on the width of the roller.

The width of the roller is selected according to an embodiment corresponding to the width of the central portion of the liner. The width of the central portion corresponds to the width of the liner with the width of the lateral portions of the liner subtracted.

According to an embodiment, the width of the roller is selected larger than 20 cm, according to a further embodiment larger than 30 cm and according to an embodiment larger than 40 cm. According to an embodiment, the width of the roller is selected smaller than 6 m, according to a further embodiment smaller than 4 m and according to a still further embodiment smaller than 3 m.

The width of lateral portions of the liner is selected corresponding to the width of lateral adhesive portions of the liner used for adhering the front and the rear side liner to each other. The lateral portions of the liner correspond to such portions of the liner that are intended to be kept free of stucco slurry.

The width of the lateral portions of the liner is selected according to the dimensions of the gypsum plasterboard to be produced. According to an embodiment, the width of the lateral portions is selected larger than 4 mm, according to a further embodiment larger than 5 mm and according to a still further embodiment larger than 6 mm. According to an embodiment, the width of the lateral portion is selected smaller than 40 mm, according to a further embodiment smaller than 30 mm and according to a still further embodiment smaller than 25 mm.

After the stucco slurry has been distributed across the central portion of the liner, excess stucco slurry spilled onto lateral portions of the liner is removed from lateral portions of the liner. A suitable stripper device is used for removal of stucco slurry form lateral portions of the liner.

According to an embodiment the stucco slurry layer is removed from lateral portions of the liner by shifting the stucco slurry layer from lateral portions of the liner towards the central portion of the liner.

According to an embodiment, the apparatus described above is used for furnishing a liner with a layer of stucco slurry of defined width.

After removal of the first stucco slurry from the overlap portions of the liner residual amounts of stucco may be present on lateral portions of the first liner. According to an embodiment, the amount of solids remaining in the overlap portions of the first liner is less than 10 mg/cm2, according to a further embodiment is less than 5 mg/cm2, and according to a further embodiment is less than 1 mg/cm2. According to an embodiment, no residual stucco is present on lateral portions of the liner.

After removal of the stucco slurry spill-over the lateral portions of the liner can remain in a wet condition. It is not mandatory to dry the lateral portions for the application of an adhesive.

According to an embodiment the lateral portions of the liner are scrubbed after the stucco slurry has been removed from the lateral portions of the liner in order to improve adhesion of an adhesive to lateral portions. Any residues still present on the lateral portions of the liner can then be removed. During scrubbing the liner surface can be roughened.

According to an embodiment, the thickness of the liner in the lateral portions is reduced while the lateral portions of the liner are scrubbed. The thickness of lateral portions is reduced according to an embodiment by grinding the lateral portions of the liner. According to an embodiment, the thickness of the lateral portions is reduced by at least 5% of its original thickness, according to another embodiment by at least 8% and according to still a further embodiment by at least 10%. According to an embodiment, the thickness of the lateral portions of the liner is reduced no more than 30%, according to a further embodiment no more than 25% and according to a still further embodiment no more than 20% of the original thickness.

After grinding the thickness of the lateral portions is less than 600 μm, according to a further embodiment it is less than 500 μm, and according to a still further embodiment it is less than 400 μm. According to an embodiment the thickness of lateral portions is more than 100 µm, according to a further embodiment more than 150 µm and according to a still further embodiment more than 200 µm.

However, lateral portions having a thickness larger or smaller than the parameters mentioned can also be used if required for a particular application of a gypsum plasterboard.

According to an embodiment, an adhesive is applied to lateral portions of the liner. The adhesive is applied after the stucco slurry is removed from lateral portions of the liner.

The adhesive is applied by a suitable device such that a homogeneous layer of adhesive is present on lateral portions of the liner. A suitable device is e.g. a nozzle for application of the adhesive onto lateral portions of the liner and a distributor device arranged downstream of the nozzle to distribute the adhesive across the lateral portions of the liner. A suitable distributor device is e.g. a spatula-like device or a latch wherein the adhesive applied to the lateral portions of the liner is distributed across the lateral portion of the liner.

The adhesive can be a water-based adhesive. According to a further embodiment, however, a waterless adhesive can be used.

A water-based adhesive usually requires some time until the full adhesive strength is achieved. This imparts some flexibility in the forming process of the gypsum plasterboard and lowers a danger that wrinkles will form on the liner during the forming process. Portions of front and rear side liners adhered to one another in the production of gypsum plasterboards can still be shifted relative to each other to facilitate adjustment of the relative position of front and rear side liner.

The liner obtained by the method according to the invention can advantageously be used in the production of gypsum plasterboards. Since a central portion of the liner arranged between lateral portions of the liner is covered with stucco slurry and a sharp boundary is formed between stucco slurry layer and adhesive portions of the liner a firm adhesion of the liner to a gypsum core of a gypsum plasterboard can be achieved.

The invention further concerns a method for producing a plasterboard, wherein
- a first stucco slurry is cast onto a first liner, thereby producing a first stucco slurry layer;
- at least a second stucco slurry is cast onto the first stucco slurry layer, thereby producing an inner stucco slurry layer provided on the first liner;
- a second liner is provided and furnished with a layer of defined width of a third stucco slurry by the method described above to obtain a second liner furnished with a layer of defined width of third stucco slurry;
- the second liner furnished with a layer of defined width of third stucco slurry is joint-deposited onto the inner stucco slurry layer provided on the first liner to obtain a plate-shaped composite comprising first and second liner and a stucco slurry layer arranged there between; and
- the plate-shaped composite is processed to a gypsum plasterboard.

In the method for producing a plasterboard is used a liner furnished with a layer of stucco slurry of defined width as is obtained by the method described above. The liner furnished with a layer of stucco slurry of defined width is used as a second liner and is joint-deposited onto a first liner with an inner stucco slurry layer deposited thereon. As already explained, the layer of third stucco slurry deposited on the second liner is contacted with the inner stucco slurry layer provided on the first liner. In the gypsum plasterboard obtained with the method according to the invention therefore the contact surface between gypsum core and second liner is formed only of the third stucco slurry layer. Therefore, an excellent adhesion between gypsum core and second liner is achieved. Further, the surface of the gypsum plasterboard formed at the side of the third gypsum slurry layer has homogeneous performance across the surface. This is beneficial in view of e.g. fire resistance, waterproofness, impact resistance etc.

The method for producing a gypsum plasterboard may comprise any step of the method for furnishing a liner with a layer of stucco slurry of defined width described above individually or in suitable combinations.

In the method for producing a plasterboard a first stucco slurry is cast onto a first liner, thereby producing a first stucco slurry layer.

The first liner preferably has sufficient width to also include side surface portions that will cover side surfaces of the gypsum plasterboard as well as overlap portions that will be folded over onto the surface of the inner stucco slurry layer.

The first liner according to an embodiment includes a central portion that will form the outer surface of the gypsum plasterboard. On both lateral sides of the central portion are arranged side surface portions that will form side surfaces of the gypsum plasterboard. On a side of the side surface portions opposite to the side of the central portion overlap portions are provided.

To simplify folding of the first liner, scores can be introduced along a line between overlap portions and side surface portions as well as along a line between side surface portions and central portion.

The width of the first liner is selected according to the size and thickness of the gypsum plasterboard to be produced.

According to an embodiment, the width of the central portion of the first liner is selected larger than 200 mm, according to a further embodiment larger than 300 mm, according to a still further embodiment larger than 350 mm. According to an embodiment, the width of the central portion of the first liner is selected smaller than 6 m, according to a further embodiment smaller than 2 m and according to a still further embodiment smaller than 1500 mm. However, first liners with central portions of smaller or larger width can be used as well.

The width of the side surface portions of the first liner is selected according to the thickness of the gypsum plasterboard to be produced. According to an embodiment, the width of the side surface portions of the first liner is larger than 5 mm, according to a further embodiment larger than 8 mm and according to a still further embodiment is larger than 10 mm. According to a further embodiment, the width of the side surface portion is smaller than 50 mm, according to a further embodiment smaller than 40 mm, and according to a still further embodiment is smaller than 30 mm. However, first liners with side surface portions of smaller or larger width can be used as well.

The width of overlap portions of the first liner is selected to be at least 4 mm, according to a further embodiment to be at least 8 mm, and according to a still further embodiment to be at least 10 mm. According to an embodiment, the width of overlap portions is less than 40 mm, according to a further embodiment is less than 30 mm and according to a still further embodiment is less than 25 mm. However, first liners with overlap portions of smaller or larger width can be used as well.

According to an embodiment, the total width of the first liner is selected to be larger than 200 mm, according to an embodiment is larger than 300 mm, and according to a still further embodiment is selected larger than 325 mm. According to an embodiment, the first liner has a width of less than 6000 mm, according to a further embodiment of less than 4000 mm and according to a still further embodiment of less than 3000 mm.

Onto the first liner is cast a first layer of a first stucco slurry. A first stucco slurry is used as commonly used in the art of production of gypsum plasterboards and the composition of the first stucco slurry is selected according to the desired performance of the gypsum plasterboard to be produced, in particular to the performance of the surface layer of the gypsum plasterboard. A suitable stucco slurry composition was already described above when explaining the method for furnishing a liner with a layer of stucco slurry of defined width.

According to an embodiment, the thickness of the first stucco slurry layer is selected larger than 100 µm, according to an embodiment larger than 150 µm and according to a still further embodiment larger than 200 µm. According to an embodiment, the thickness of the stucco slurry layer is selected smaller than 2 mm, according to a further embodiment smaller than 1.5 mm and according to a still further embodiment smaller than 1 mm.

However, a first stucco slurry layer of smaller or larger thickness can be used as well.

At least a second stucco slurry is cast onto the first stucco slurry layer, thereby producing an inner stucco slurry layer provided on the first liner.

The second stucco slurry can have the same composition as the first stucco slurry or can have a composition different from the composition of the first slurry. According to an embodiment, the second stucco slurry has a lower density than the first stucco slurry. The density of the second stucco slurry can be lowered by e.g. adding foam to the stucco slurry. A gypsum layer of high porosity can then be obtained.

Optionally further layers of stucco slurry are cast onto the layer of the second stucco slurry. In such embodiment an inner stucco slurry layer is obtained comprising several layers.

According to an embodiment, side surface portions of the first liner are folded upwardly to form an edge at lateral sides of the central portion of the first liner. The folding can be done before, during or after application of the second stucco slurry and optionally further layers of stucco slurry. According to an embodiment, the folding of side surface portions of the first liner is performed simultaneously with the casting of the second stucco slurry.

According to an embodiment, after the inner stucco slurry layer is cast, overlap portions of the first liner are folded onto the surface of the inner stucco slurry layer. Overlap portions are then arranged along lateral sides of the inner stucco slurry layer. Between the overlap portions of the first liner the surface of the inner stucco slurry layer is accessible.

A second liner is provided and furnished with a layer of defined width of a third stucco slurry by the method described above to obtain a second liner furnished with a layer of defined width of third stucco slurry.

The composition of the third stucco slurry can be the same as of the first stucco slurry or may be different.

According to an embodiment the defined width of the layer of defined width of third stucco slurry corresponds to the width of the surface of the inner stucco slurry layer provided on the first liner and accessible after folding of the overlap portions of the first liner onto the inner stucco slurry layer.

Further, according to an embodiment, the width of the lateral portions of the second liner corresponds to the width of the overlap portion of the first liner.

The second liner furnished with a layer of third stucco slurry is joint-deposited onto the inner stucco slurry layer provided on the first liner to obtain a plate-shaped composite comprising first and second liner and a stucco slurry layer arranged there between.

The third stucco slurry layer provided on the second liner is contacted with the surface of the inner stucco slurry layer accessible between lateral overlap portions of the first liner to form a gypsum core of the gypsum plasterboard. Lateral portions of the first liner are joined to overlap portions of the first liner.

In an embodiment wherein an adhesive is applied to the lateral portions of the first liner an adhesive bond is formed between lateral portions of the second liner and overlap portions of the first liner and a firm bond of the second liner to the gypsum plasterboard can be achieved.

The plate-shaped composite is then processed to a gypsum plasterboard. For processing of the plate-shaped composite methods known from the art of producing gypsum plasterboards can be used. The gypsum core formed from first stucco slurry layer, inner stucco slurry layer and a layer of third stucco slurry is set and dried by methods common in the art. Further, the gypsum plasterboards can be cut to the desired size.

Figure 2:
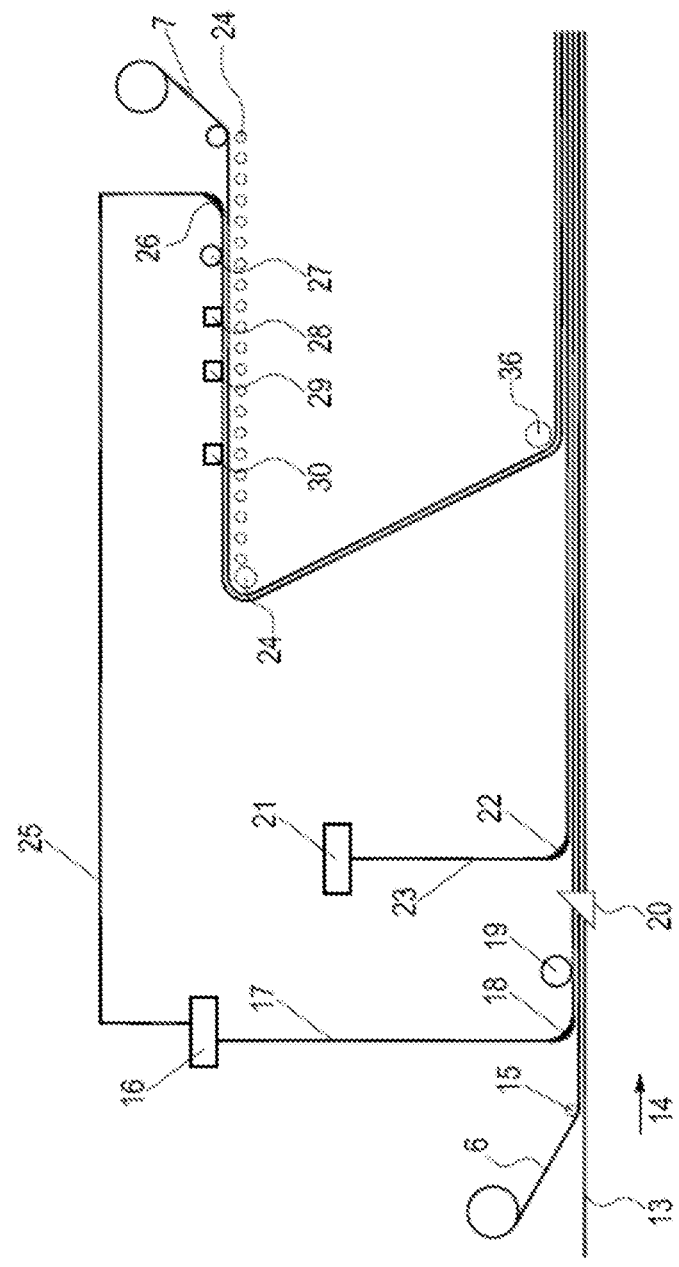
Figure 3:
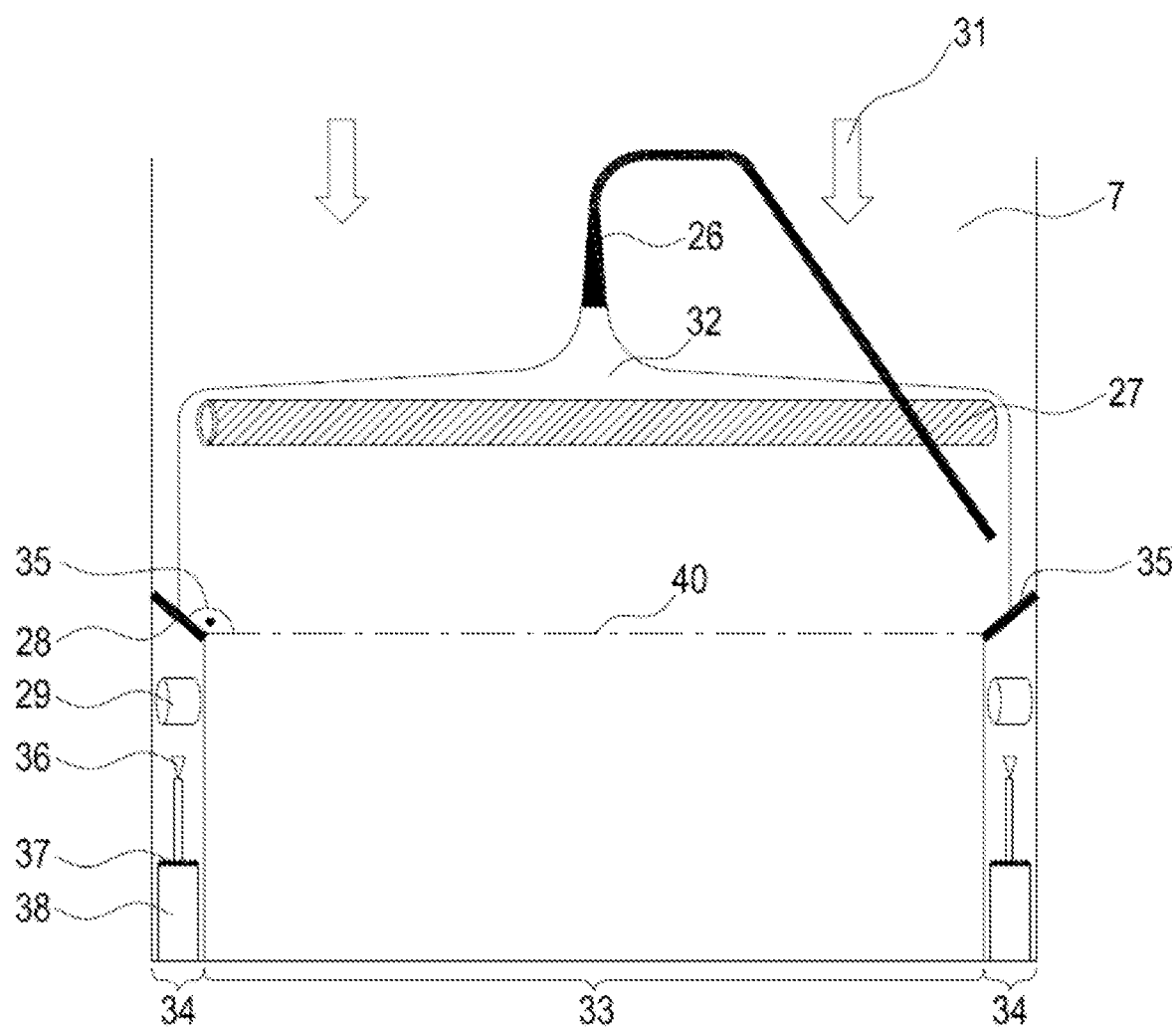
Figure 4:
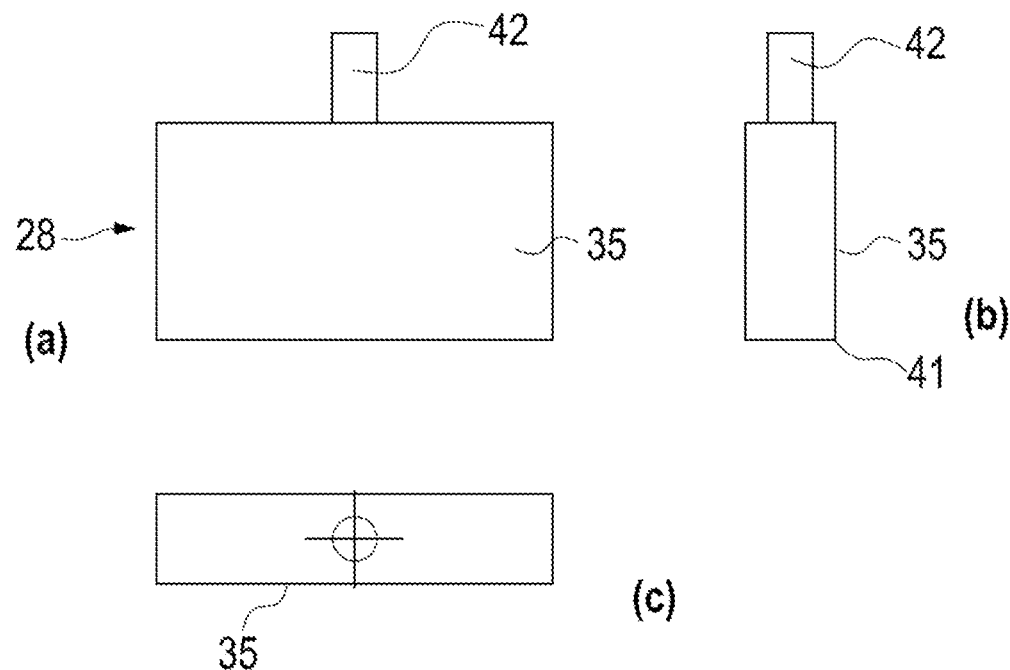
Figure 5:
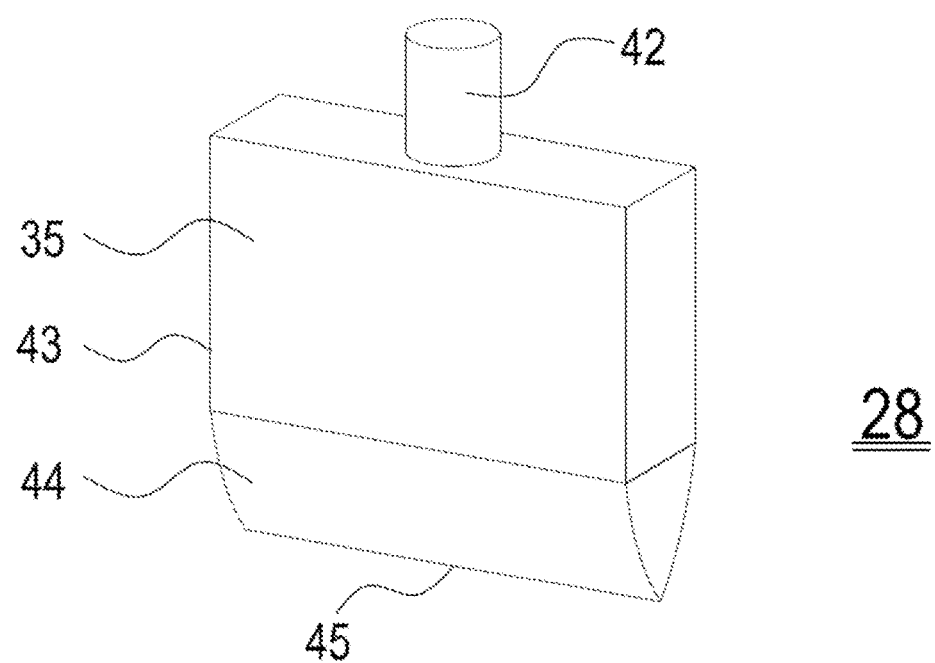

The invention will be explained in more detail with reference to the accompanying figures, wherein the figures show:

FIG. 1: is a section through a gypsum plasterboard;

FIG. 2: is a scheme of a part of a production line for producing gypsum plasterboards comprising the apparatus for furnishing a liner with a layer of stucco slurry according to the invention;

FIG. 3: is a top view of the apparatus according to the invention;

FIG. 4: is a view of a first embodiment of a stripper device as used according to the invention; and FIG. 5: is a perspective view of a second embodiment of a stripper device as used according to the invention.

FIG. 1 shows a section through a gypsum plasterboard.

Gypsum plasterboard 1 comprises a gypsum core 2. The gypsum core 2 has a layered structure comprising a first gypsum layer 3, a second gypsum layer 4, and a third gypsum layer 5. Gypsum core 2 is surrounded by a first liner 6 and a second liner 7. The first liner 6 covers the outer surface of the first gypsum layer 3 forming the visible side of gypsum plasterboard 1. The first liner 6 is folded around an outer edge of first gypsum layer 3 and is abutted on side surface portions 8 of first gypsum layer 3 and second gypsum layer 4 forming side surfaces of the gypsum plasterboard 1. First liner 6 is folded across an upper edge of second gypsum layer 4 and is fixed to an outer surface of second gypsum layer 4 with overlap portions 9. Between overlap portions 9 is arranged third gypsum layer 5. Lateral portions 10 of second liner 7 are adhered to overlap portions 9 of first liner 6 by an adhesive layer 11. The outer surface of the third gypsum layer 5 covered by second liner 7 forms the rear side of gypsum plasterboard 1.

FIG. 2 schematically shows a production line for producing gypsum plasterboards. A first liner 6 is continuously conveyed on a conveyor belt 13. Conveyor belt 13 has a transport direction indicated by arrow 14. First liner 6 is positioned flat on conveyor belt 13 by roller 15. A first slurry is prepared in first mixer 16 and is transported through distribution line 17 to first stucco slurry feeder 18 to be cast onto first liner 6. The first slurry is distributed across the surface of first liner 6 by a roller 19 to obtain a layer of first stucco slurry. Lateral portions of the first liner 6 are then folded upwardly by folding device 20. A second stucco slurry is prepared in second mixer 21 and transported to second slurry feeder 22 through distribution line 23. The second slurry is cast onto the first stucco slurry layer by second stucco slurry feeder device 22.

A second liner 7 is continuously conveyed via a series of rollers 24. A third stucco slurry from first mixer 16 is transported through distribution line 25 to third stucco slurry feeder 26 and is cast onto to second liner 7. The first stucco slurry and the third stucco slurry can be the same. However, they also can be different, for example concerning the additives contained in the slurry. The third stucco slurry is distributed across the surface of second liner 7 by roller 27. Third stucco slurry spilled onto lateral portions of second liner 7 is removed by stripping device 28. Lateral portions of second liner 7 are then brushed by grinder 29 wherein the thickness of second liner 7 is reduced in the lateral portions. An adhesive is applied to lateral portions of the second liner 7 by adhesive feeder 30.

The second liner 7 is diverted by roller 36 and its slurry coated side is contacted with the second stucco slurry layer placed on first liner 6 thereby forming a layered core stucco layer sandwiched between the first liner 6 and the second liner 7.

The layered formation of first liner 6, first, second, and third stucco slurry layer and second liner 26 is then formed into a plate-like composite by a forming device (not shown).

FIG. 3 shows a top view of an apparatus for furnishing a liner with a layer of stucco slurry according to the invention.

A liner 7 is transported via a series of rollers (not shown) in a transport direction 31. Third gypsum slurry 32 is cast onto liner 7 by stucco slurry feeder device 26 connected to first mixer 16 (not shown). Roller 27 distributes stucco slurry 32 across liner 7 such that central portion 33 of liner 7 is covered by a layer of stucco slurry. The width of roller 27 corresponds approximately to the width of central portion 33 of liner 7. Excess stucco slurry is spilled around terminal ends of roller 17 onto lateral portions 34 of liner 7.

By action of stripper devices 28 stucco slurry 32 present in lateral portion 34 of liner 7 is redirected towards central portion of liner 7. Stripper device 28 is tilted such that its side edge which is closer to the middle of the liner is arranged further downstream than its outer side edge. The stripper device 28 comprises a deflection side 35 for redirecting stucco slurry 32 spilled onto lateral portions 34 of liner 7 towards the central portion 33. A tilt angle 39 is enclosed between deflection side 35 and a plane 40 transversal to the transport direction 31. In the embodiment shown in FIG. 3 an angle of 135° is enclosed between deflection side 35 and plane 40.

A round grinding belt 29 for abrading material of liner 7 to thereby reduce the thickness of liner 7 in lateral portions 34 is provided downstream of stripper device 28.

An adhesive feeder comprising a nozzle 36 for ejecting adhesive onto lateral portions 34 of liner 7 and a blade 37 for distributing the adhesive across lateral portion 34 of liner 7 to obtain a trace 38 of adhesive are provided downstream of grinding belt 29.

FIGS. 4a-c schematically show a first embodiment of a stripper device 28 as used according to the invention for removing stucco slurry from lateral portions of a liner. The embodiment shown in FIG. 4 has rectangularly arranged outer surfaces.

FIG. 4a shows the front side of stripper device 28 corresponding to deflection side 35 of the stripper device. Deflection side 35 is formed as a rectangular flat plane. An attachment device 42 is provided for attaching the stripper device to the conveying line (not shown).

FIG. 4b shows a side view of the stripper device. At the lower end of deflection side 35 is provided a lower edge 41. Lower edge 41 has a rectangular shape in the embodiment shown. However, it is also possible to provide a rounded shape to lower edge 41. Lower edge 41 is gliding on the liner (not shown). Stucco slurry provided on the liner is retained by deflection side 35 and is removed from lateral portions of the liner.

FIG. 4c shows a top view of stripper device 28. Deflection side 35 is facing against the transport direction. The stripper device has an overall cuboid form with surfaces arranged to each other with rectangular angels.

FIG. 5 shows a perspective view of a second embodiment of the stripper device 28 as used according to the invention. The stripper device 28 is attached to an attachment device 42, fixing the stripper device 28 to the production line. Stripper device 28 comprises an upper body 43 having a cuboid form. The upper body 43 is continued to a lower body 44. In the lower body the thickness of the stripping device is gradually reduced to a scraper lip 45 positioned at the lower end of the stripping device at a side opposite to attachment device 42. During operation of the production line according to the invention scraper lip 45 contacts the surface of the liner to push away stucco slurry present in lateral portions of the liner.

REFERENCE NUMERALS

1 Gypsum plasterboard
2 Gypsum core
3 First gypsum layer
4 Second gypsum layer
5 Third gypsum layer
6 First liner
7 Second liner
8 Edge portion
9 Overlap portion of first liner
10 Lateral portion of second liner
11 Adhesive layer
12 First slurry mixer
13 Conveyor belt
14 Transport direction
15 Roller
16 First mixer
17 Distribution line
18 First stucco slurry feeder
19 Roller
20 Feeding device
21 Second mixer
22 Second stucco slurry feeder
23 Distribution line
24 Roller
25 Distribution line
26 Third stucco slurry feeder
27 Roller
28 Stripper device
29 Grinder
30 Adhesive feeder
31 Transport direction 32 First stucco slurry
33 Central portion
34 Lateral portion
35 Deflection side
36 Roller
37 Blade
38 Adhesive trace
39 Tilt angle
40 Plane
41 Lower edge
42 Attachment device
43 Upper body
44 Lower body
45 Scraper lip

The invention claimed is:

1. A method for furnishing a liner with a layer of stucco slurry of defined width, comprising:
providing the liner and continuously conveying the liner along a transport direction;
casting the layer of stucco slurry onto a surface of the liner;
distributing the layer of stucco slurry across the liner;
removing the layer of stucco slurry from lateral portions of the liner to obtain the liner with the layer of stucco slurry of defined width;
scrubbing lateral portions of the liner after removing the layer of stucco slurry from the lateral portions of the liner; and
reducing the thickness of the liner in the lateral portions during scrubbing of the lateral portions of the liner.

2. The method according to claim 1, further comprising:
applying an adhesive to the lateral portions of the liner after removing the layer of stucco slurry from lateral portions of the liner.

3. The method according to claim 1, the method further comprising:
casting a second layer of stucco slurry onto the layer of stucco slurry on the liner;
providing a second liner and continuously conveying the second liner along a transport direction;
casting a third layer of stucco slurry onto a surface of the second liner;
distributing the third layer of stucco slurry across the second liner;
removing the third layer of stucco slurry from lateral portions of the second liner to obtain the second liner with the third layer of stucco slurry of defined width;
joint-depositing the third layer of stucco slurry onto the second layer of stucco slurry so as to join the liner and the second liner and produce a plate-like composite; and
processing the plate-like composite to produce a gypsum plasterboard.

* * * * *